United States Patent [19]

Pyrih et al.

[11] 4,258,015

[45] Mar. 24, 1981

[54] RECOVERING URANIUM FROM WET PROCESS PHOSPHORIC ACID WITH ALKYLPHENYL PHOSPHATES

[75] Inventors: Roman Z. Pyrih; Robert S. Rickard, both of Golden; Orin F. Carrington, Arvada, all of Colo.

[73] Assignee: Earth Sciences, Inc., Golden, Colo.

[21] Appl. No.: 845,352

[22] Filed: Oct. 25, 1977

[51] Int. Cl.$^2$ .............................................. C01G 43/00
[52] U.S. Cl. ......................................... 423/10; 423/20
[58] Field of Search ................................... 423/10, 20

[56] References Cited

U.S. PATENT DOCUMENTS

| 2,859,092 | 11/1958 | Bailes et al. | 423/10 |
|---|---|---|---|
| 2,860,031 | 11/1958 | Gainstead | 423/10 |
| 3,711,591 | 1/1973 | Hurst et al. | 423/10 |
| 3,835,214 | 9/1974 | Hurst et al. | 423/20 |

OTHER PUBLICATIONS

Murthy et al., "Study of Some Phenyl Phosphoric Acids for Extraction of Uranium from Phosphoric Acid", IAEA-SM-135/11, pp. 341–350 (1970).

Hurst et al. (III), *Ind. Eng. Chem. Process Des. Develop.*, 13 (#3), 286–291 (1974).

*Primary Examiner*—Edward A. Miller
*Attorney, Agent, or Firm*—Sheridan, Ross, Fields & McIntosh

[57] ABSTRACT

An improvement in the process for the recovery of uranium from a phosphoric acid solution derived from the acidification of uraniferous phosphate ores including the steps of reducing the uranium in the phosphoric acid solution to the uranous form and contacting the resulting solution with a liquid-liquid solvent extraction agent which is a mixture of mono- and di-(alkyl-phenyl) esters of orthophosphoric acid dissolved in an inert organic diluent, to effect recovery of the uranium with the liquid-liquid solvent extraction agent, the improvement being maintaining the proper ratio of the mono and di-components of the liquid-liquid solvent extraction mixture which comprises removing dissolved and entrained uranium process organics from the raffinate resulting from said liquid-liquid solvent extraction step and recycling the removed organics to said liquid-liquid solvent extraction step.

4 Claims, 3 Drawing Figures

TOTAL ORGANIC CARBON IN COLUMN EFFLUENT FROM CYCLE A, B, C, BB AND CC

ACID FEED  RAFFINATE

INFRARED SPECTRA OF ORGANICS IN PHOSPHORIC ACID FEED AND IN URANIUM RECOVERY CIRCUIT RAFFINATE

INFRARED SPECTRA OF ORGANICS IN COLUMN EFFLUENT FROM FIRST ABSORBTION CYCLE (CYCLE "A") AND FROM SEVENTH ABSORBTION CYCLE (CYCLE "BB")

RECOVERING URANIUM FROM WET PROCESS PHOSPHORIC ACID WITH ALKYLPHENYL PHOSPHATES

BACKGROUND OF THE INVENTION

The present invention relates to improvements in processes like that disclosed in U.S. Pat. No. 3,835,214 to Hurst, et al. which patent is incorporated herein by reference for recovering uranium from wet process phosphoric acid. The phosphoric acid is an intermediate product of the wet process for producing phosphate fertilizer by treating uraniferous phosphate ores with sulfuric acid. The phosphoric acid contains sufficient uranium to warrant its recovery.

As disclosed in the above-mentioned patent, the uranium is conventionally recovered from the phosphoric acid solution by two liquid-liquid solvent extraction stages. In the first stage the uranium is reduced to uranous form and recovered from the solution with a liquid-liquid solvent extraction agent consisting of a mixture of mono- and di-(alkyli-phenyl) esters of orthophosphoric acid (OPPA) dissolved in an inert organic solvent and the loaded agent subjected to an oxidative strip with phosphoric acid and an oxidizing agent it is postulated that the extraction agents of this process work by ion exchange, and they are therefore referred to in the following discussion as "ion exchange agents", and the liquid-liquid solvent extraction steps are referred to as "ion exchange steps". The loaded agent is stripped and subjected to a second liquid-liquid solvent extraction (ion exchange) step followed by a further procedure to recover product uranium oxide, all as disclosed in the above mentioned patent and as improved in our copending U.S. patent Ser. No. 833,247 filed in the U.S. Patent and Trademark Office on Sept. 14, 1977.

The use of the mixture of mono- and di-(alkyl-phenyl) esters of OPPA as an extraction agent for the recovery of uranous uranium from wet process phosphoric acid is fully discussed in an article entitled "Recovery of Uranium From Wet-Process Phosphoric Acid by Extraction with Octylphenylphosphoric Acid," F. J. Hurst and D. J. Crouse, Industrial Engineering Chemistry, Process Design Development, Volume 13, Number 3, 1974, pages 286–291. More recently, the topic was discussed by F. J. Hurst in a paper entitled "Recovery of Uranium From Wet-Process Phosphoric Acid by Solvent Extraction," presented at the AIME Annual Meeting in Las Vegas, Nevada—Feb. 22–26, 1976. It is stated in both articles that in process use of the OPPA mixture, the mono-OPPA is lost to the aqueous preferentially to the di-OPPA. Mono-OPPA distribution loss to the aqueous phase is about 25 parts per million parts of aqueous whereas the distribution loss of the di-OPPA is negligible. Preferential loss of the mono-OPPA from the OPPA-organic mixture results in imbalance of the ratio of di- to mono-component. Table 1 summarizes experimental data developed by F. J. Hurst which support the above statements. As can be seen in Table 1, the uranium extraction coefficient was about 30 in extractions with an equimolar mixture of the mono- and di-OPPA compared to about 2 with either component alone. Unchecked preferential loss of the mono-OPPA component from the OPPA-extraction agent results in significant additional expense because of the necessity of continuous repletion of the mono-OPPA component during continuous operation of the process.

Accordingly, it is an object of this invention to provide an improvement in the stated uranium recovery method, the improvement being the recovery of the mono-OPPA component from the aqueous with subsequent recycle of the mono-OPPA components to said OPPA-organic extraction mixture.

TABLE 1

Effect of Mole Ratio of Mono- and Di-OPPA on Uranium Extraction*

| OPPA Concentration (M) | | Uranium Extraction Coefficient |
|---|---|---|
| Mono- | Di- | $(E_a^o)$ |
| 0.200 | — | 2.1 |
| 0.175 | 0.025 | 5.3 |
| 0.150 | 0.050 | 10 |
| 0.125 | 0.075 | 16 |
| 0.100 | 0.100 | 30 |
| 0.075 | 0.125 | 30 |
| 0.050 | 0.150 | 37 |
| 0.025 | 0.175 | 30 |
| — | 0.200 | 2.3 |

*F. J. Hurst, "Recovery of Uranium from Wet-Process Phosphoric Acid by Solvent Extraction," AIME Annual Meeting, Las Vegas, Nevada, February 22–26, 1976, Preprint Number 76-B-66, p. 21.

SUMMARY OF THE INVENTION

The invention comprises the removal of the uranium process organics from the raffinate of the first liquid-liquid extraction step and their return to the circuit. The term "uranium process organics" refers to the liquid-liquid solvent extraction agent (OPPA) and solvent of the first liquid-liquid solvent extraction step and includes the mono-OPPA component. The uranium process organics are removed from the raffinate by a combination flotation and absorption step in which latter step the uranium process organics are recovered on beads of a hydrophobic polymer of stryene.

DESCRIPTION OF THE PREFERRED EMBODIMENTS

Figure 1:
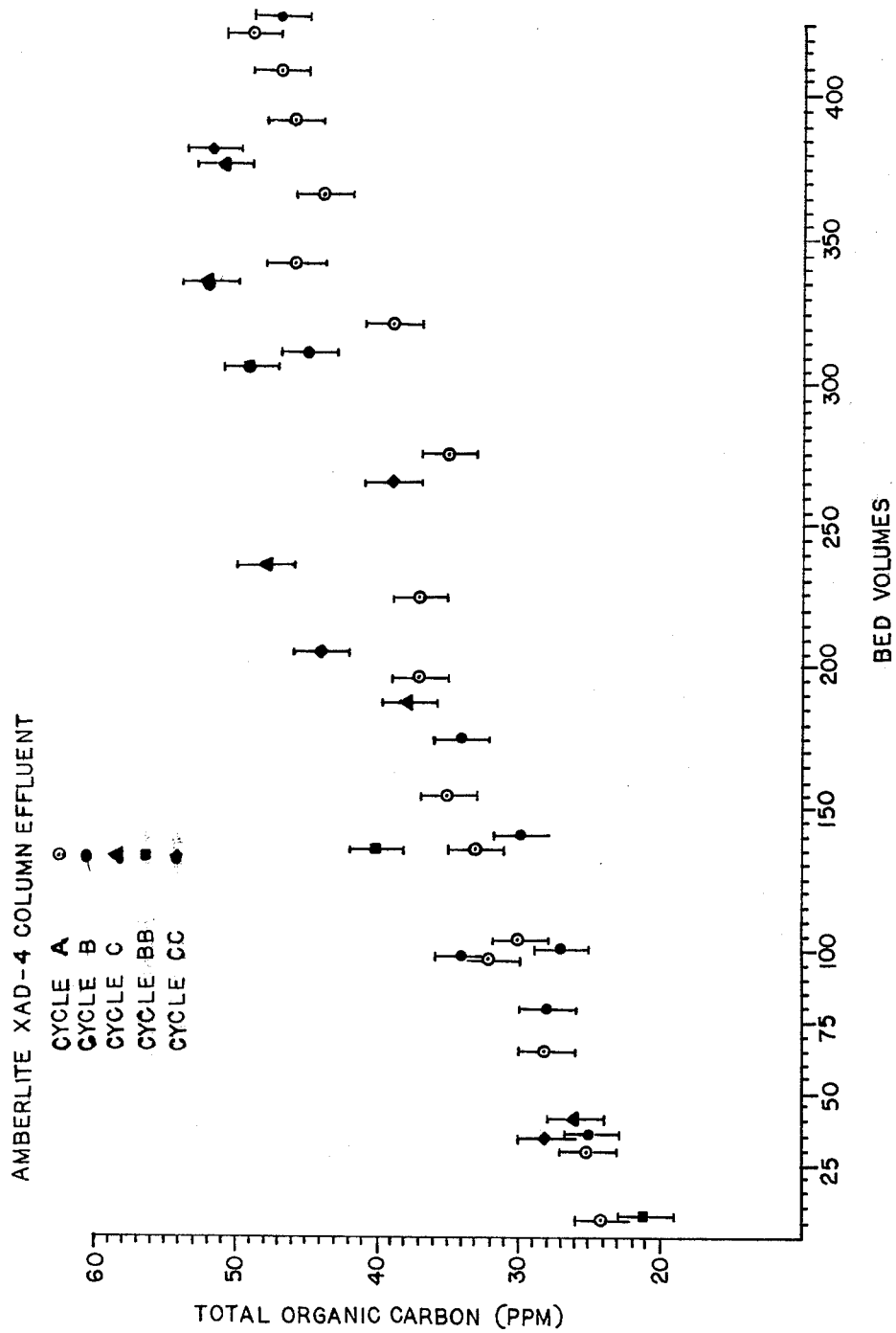
FIG. 1 is a graph in which the total organic carbon found in Amberlite XAD-4 column effluent samples is plotted against bed volumes of flotation underflow passed through the column during absorption cycles A, B, C, BB and CC.

The invention will now be described with reference to the illustrative examples presented below.

The term "OPPA" as used herein includes the liquid-liquid solvent extraction mixture of the mono- and di-(alkyl-phenyl) esters of orthophosphoric acid.

The results recorded below were run on wet-process phosphoric acid feed which had a chemical profile typified by the following analysis which is a typical feed solution received from a wet-process plant.

| | |
|---|---|
| $U_3O_8$, gpl: | 0.140 |
| emf, mv: | −260 |
| Total Fe, gpl: | 4.1 |

| -continued | |
|---|---|
| $Fe^{+2}$, gpl | 0.47 |
| $H_3PO_4$, % | 39.1 |
| Specific Gravity | 1.3085 |

The extraction of uranium with OPPA in the first liquid-liquid solvent extraction step followed the procedure used in U.S. Pat. No. 3,835,214. The feed was preconditioned to an emf of −210 mv with iron to reduce the uranium to the uranous form and contacted with 0.32 molar mixture of mono- and di(alkyl-phenyl) esters of OPPA dissolved in kerosene. Four countercurrent extraction stages were used. Greater than 90 percent $U_3O_8$ extraction was consistently obtained. The following table presents extraction results based on actual circuit operation.

TABLE 2

| | EXTRACTION CIRCUIT (After 225 Hours of Operation) | | |
|---|---|---|---|
| Cell | $U_3O_8$, gpl | | $U_3O_8$ Extraction |
| No. | Aqueous | Organic | Percent |
| E-1 | 0.047 | 0.80 | 63.9 |
| E-2 | 0.024 | 0.29 | 81.5 |
| E-3 | 0.009 | 0.15 | 93.5 |
| E-4 | 0.009 | 0.15 | 93.5 |
| Feed | 0.130 | — | — |

RECOVERY OF PROCESS ORGANICS FROM THE FIRST CIRCUIT RAFFINATE

A method of analysis for organics in the raffinate was developed in which the absolute organic concentration in the raffinate was determined by total organic carbon assays. The presence of uranium process organics was monitored by surface tension measurements on the raffinate and verified by infrared spectroscopy. Multiple independent analytical techniques demonstrated the effectiveness of the uranium process organics removal and recovery process.

During actual circuit operation it was found that about 9.76 lbs. of uranium process organics were lost in every 1,000 gals. of raffinate. This loss was due to entrainment and dissolution of the liquid-liquid solvent extraction agent and solvent in the raffinate.

It was found that the uranium process organics, including the mono-OPPA component, can be substantially recovered by combining a conventional flotation method with resin absorption. Using this procedure, all the uranium process organics introduced to the acid during the uranium recovery process can be removed from the phosphoric acid raffinate prior to its return to the wet-process plant.

The flotation tests were conducted in a conventional flotation cell. Experiments suggested a flotation time of about 20 minutes was needed to remove most of the entrained uranium process organics from the raw raffinate. However, total organic carbon assays and surface tension measurements showed that an additional secondary treatment was necessary to further reduce the level of dissolved uranium process organics remaining in the floatation underflow.

The agent used for the secondary treatment was Amberlite XAD-4 resin, an experimental polymeric absorbent developed by Rohm and Haas. This type absorbent is described in U.S. Pat. No. 3,531,463. The agent is a completely hydrophobic, polystyrene, polymeric resin.

To test the absorbent's ability to remove dissolved and entrained uranium process organics from the raffinate, a column was assembled and packed with hydrated Amberlite XAD-4 resin. After preconditioning the polystyrene resin beads with methanol and back washing and classifying with demineralized water, the absorption cycle was started. Flotation underflow from the conventional flotation step was utilized as the column feed. The absorption cycle was conducted at a down flow rate of about 7 bed volumes per hour. The first absorption cycle was taken to near saturation of the resin by uranium process organics. About 1217 bed volumes of raffinate were passed through the column in the first absorption cycle. Total organic carbon assays of the column effluent showed that substantially all of the uranium process organics were removed from the raffinate during the first 400 bed volumes of operation. This finding was confirmed by surface tension measurements on the column effluent and by qualitative infrared spectroscopy. Surprisingly, the absorbent was effective in removing uranium process organics from strongly acid solution.

Results of a typical run using the above described procedure for removing uranium process organics are presented in Table 3.

After a typical absorption cycle the uranium process organics were eluted off the polystyrene resin with about 3-5 bed volumes of methanol. The methanol was eluted with demineralized water and the resin beads reclassified for the next absorption cycles. Six additional absorption-elution cycles were conducted with the same resin sample. About 4,956 bed volumes of raffinate were treated in total during these cycles. In FIG. 1, the total organic carbon found in Amberlite XAD-4 column effluent samples is plotted against bed volumes of flotation underflow passed through the column during absorption cycles A, B, C, BB, and CC. No loss in capacity to absorb uranium process organics from plant raffinate was observed.

TABLE 3

TYPICAL EFFECT OF FLOTATION AND POLYSTYRENE RESIN TREATMENT ON ORGANIC CARBON CONTENT OF UNTREATED RAFFINATE

| Sample Material | Total Organic Carbon (ppm) | Surface Tension (dynes/cm) |
|---|---|---|
| Uranium Circuit Feed Acid (39% $H_3PO_4$) | 19–50 | 78.8–79.2 |
| Untreated Raffinate | 122–154 | 35.6–36.3 |
| Raffinate After Flotation Treatment | 88–102 | 58.9–65.6 |
| Raffinate After Polystyrene Resin Treatment (at 400 bed volumes) | 46–54 | 79.6–81.0 |

Figure 2:
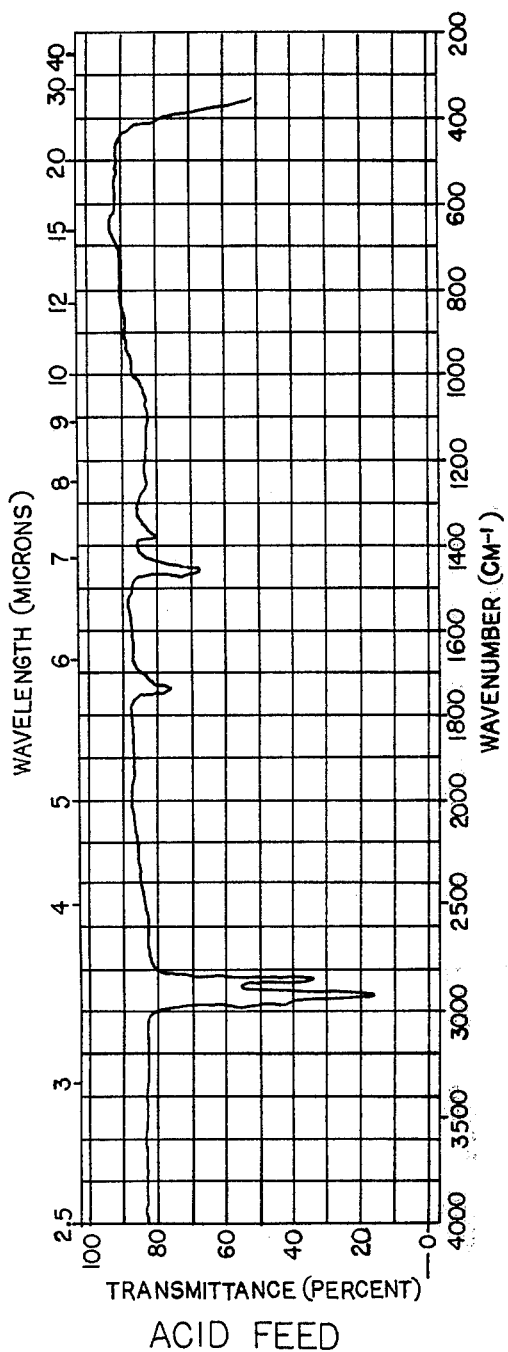
FIG. 2 is a typical infrared spectrum in which the organic material indigenous to the phosphoric acid feed to the uranium recovery circuit is compared to a spectrum of the organics present in typical raffinate from the uranium recovery circuit.
Figure 2:
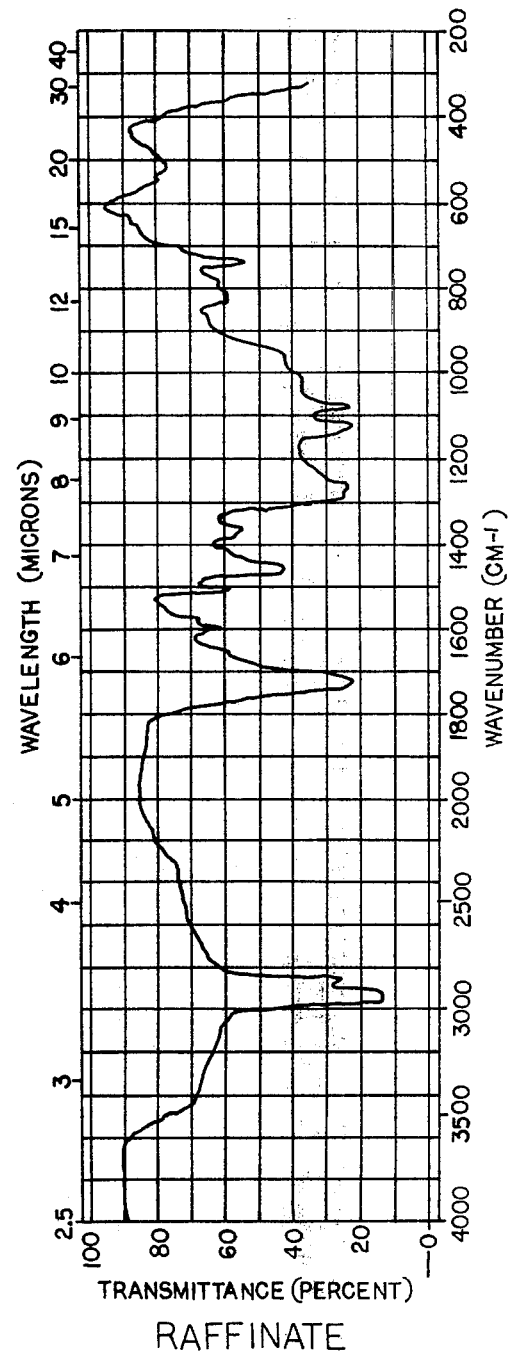

In FIG. 2, a typical infrared spectrum of the organic material indigenous to the phosphoric acid feed to the uranium recovery circuit is compared to a spectrum of the organics present in typical raffinate from the uranium recovery circuit. Clearly, some uranium process organics were lost to the raffinate. The broad, strong infrared absorption peaks between 1,300 and 950 cm$^{-1}$ in the raffinate specturm are characteristic of the OPPA liquid-liquid solvent extraction agent.

Figure 3:
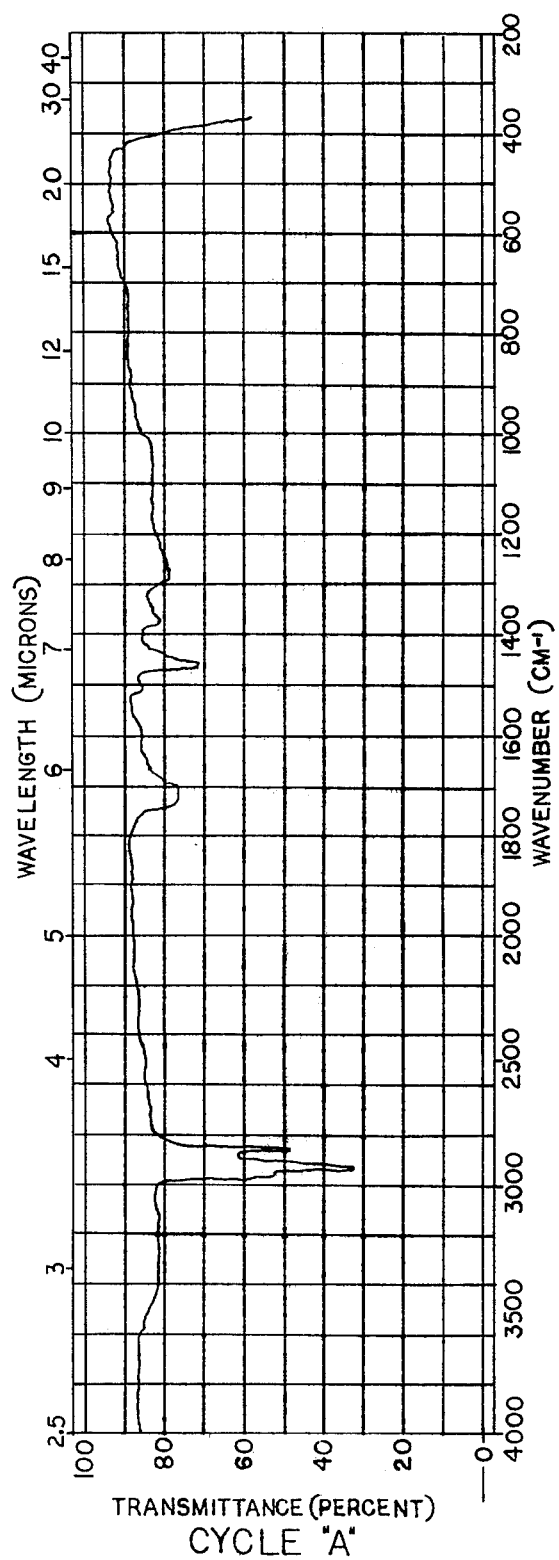
FIG. 3 shows two infrared spectra of the organic material remaining in the raffinate after flotation and polystyrene resin treatment.
Figure 3:
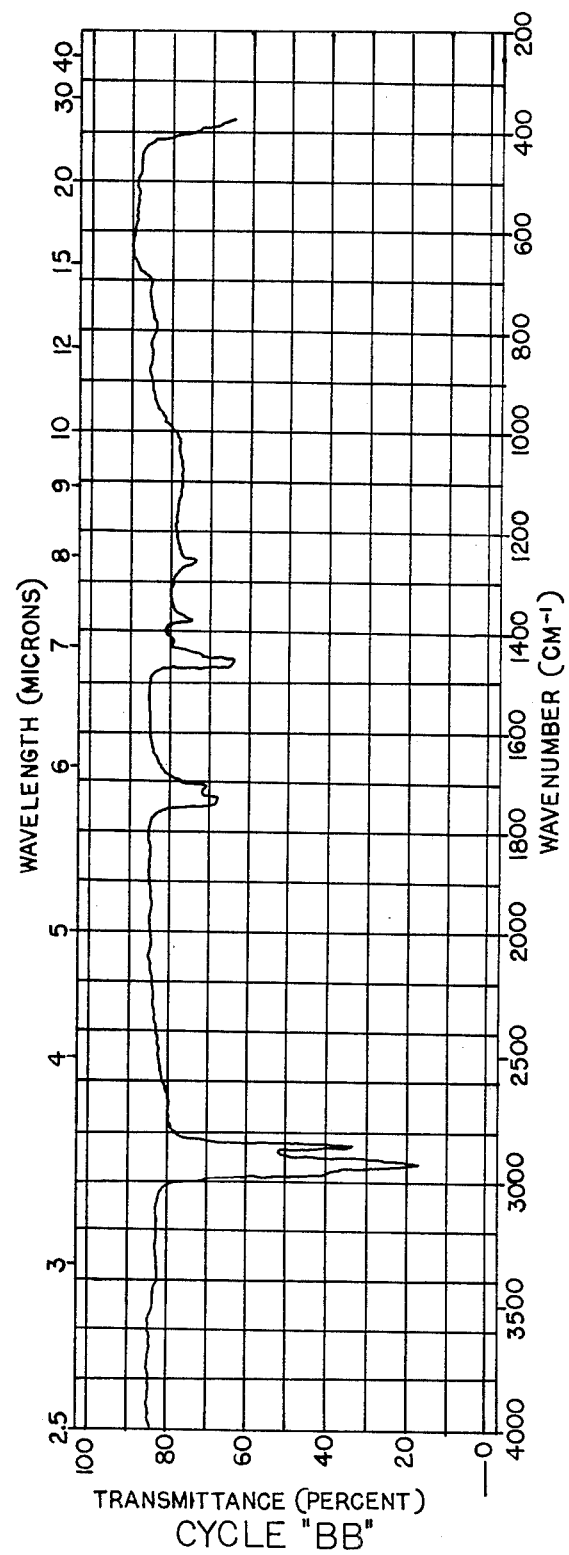

FIG. 3 shows two infrared spectra of the organic material remaining in the raffinate after flotation and polystyrene resin treatment. The spectra of FIG. 3 are very similar to the spectra of organic materials found in typical uranium plant feed acid (FIG. 2). The OPPA liquid-liquid solvent extraction agent introduced into the raffinate was removed by the organic recovery process. Furthermore, the spectrum of Cycle BB depicted in FIG. 3 demonstrates that the Amberlite XAD-4 resin can be reused through numerous absorption-elution cycles with no loss in capacity to recover OPPA liquid-liquid solvent extraction agent from raffinate.

The uranium process organics, including the mono-OPPA components, eluted from the polystyrene resin with methanol were recovered by distilling off the methanol solvent. The recovered organics were recycled to the OPPA uranium extraction circuit. No loss of mono or di-component of OPPA occurs when the uranium process organics recovered from the raffinate are recycled back to the OPPA liquid-liquid solvent extraction circuit during continuous operation of the complete uranium recovery process.

We claim:

1. In the process for the recovery of uranium from a phosphoric acid solution derived from the acidification of uraniferous phosphate ores including the steps of reducing the uranium in the phosphoric acid solution to the uranous form and contacting the resulting solution with a liquid-liquid solvent extraction agent which is a mixture of mono and di-(alkylpheny)esters of ortho phosphoric acid dissolved in an inert organic diluent, and wherein some of the extraction agent is lost in the raffinate, the improvement resulting in a continuous process with little addition of fresh extraction agent being required which comprises maintaining a preferred di- to mono-component ratio in the extraction agent by continuously contacting the raffinate with beads of hydrophobic polystyrene polymer to absorb the components of the extraction agent on the beads, recovering the absorbed components from said beads and continuously returning the recovered di- and mono-components to the extraction circuit at a rate to maintain the required ratio.

2. The process of claim 1 in which that part of the extraction agent which is lost is substantially the mono component and this component is recovered and continuously recycled to the solvent extraction circuit at a rate to maintain said ratio.

3. The process of claim 1 in which the absorption step is preceded by a flotation step for recovery of the components.

4. The process of claim 2 in which the absorption step is preceded by a flotation step for recovery of the mono-component.

* * * * *